United States Patent
Wu

(10) Patent No.: US 10,560,911 B2
(45) Date of Patent: *Feb. 11, 2020

(54) DEVICE AND METHOD OF HANDLING CARRIER AGGREGATION AND DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,505

(22) Filed: Aug. 1, 2018

(65) Prior Publication Data
US 2019/0045467 A1 Feb. 7, 2019

Related U.S. Application Data

(60) Provisional application No. 62/540,034, filed on Aug. 1, 2017.

(51) Int. Cl.
*H04W 56/00* (2009.01)
*H04W 76/27* (2018.01)
(Continued)

(52) U.S. Cl.
CPC ...... *H04W 56/0015* (2013.01); *H04B 7/0626* (2013.01); *H04J 11/0076* (2013.01); *H04L 27/0014* (2013.01); *H04L 27/2692* (2013.01); *H04W 74/008* (2013.01); *H04W 74/0833* (2013.01); *H04W 76/15* (2018.02);
(Continued)

(58) Field of Classification Search
CPC ............. H04W 56/0015; H04W 76/15; H04W 74/0833; H04W 74/008; H04W 76/27; H04W 48/08; H04W 72/042; H04L 27/2692; H04L 27/0014; H04L 2027/0095; H04J 11/0076; H04B 7/0626
See application file for complete search history.

(56) References Cited

U.S. PATENT DOCUMENTS

2016/0183323 A1* 6/2016 Rahman ............ H04W 74/0833
370/329

FOREIGN PATENT DOCUMENTS

WO 2016/126099 A1 8/2016

OTHER PUBLICATIONS

3GPP TS 37.340 V0.2.0, 3rd Generation Partnership Project; Technical Specification Group Radio Access Network; Evolved Universal Terrestrial Radio Access (E-UTRA) and NR; Multi-connectivity; Stage 2 (Release 15) Jul. 5, 2017, pp. 1-43.
(Continued)

*Primary Examiner* — Dady Chery
(74) *Attorney, Agent, or Firm* — Winston Hsu

(57) ABSTRACT

A network comprising a first base station (BS) and a second BS is configured to execute instructions of the first BS connecting to a communication device via a first cell of the first BS with a signaling radio bearer (SRB); the second BS as a secondary node (SN) connecting to the communication device via a second cell while the first BS as a master node (MN) connecting to the communication device; and the second BS transmitting a SN Modification Required message comprising a radio resource control (RRC) message to the first BS, wherein the RRC message comprises a new or modified configuration and a random access (RA) channel (RACH) configuration.

12 Claims, 6 Drawing Sheets

(51) Int. Cl.
*H04W 74/00* (2009.01)
*H04W 74/08* (2009.01)
*H04W 76/15* (2018.01)
*H04B 7/06* (2006.01)
*H04L 27/00* (2006.01)
*H04J 11/00* (2006.01)
*H04L 27/26* (2006.01)
*H04W 72/04* (2009.01)
*H04W 48/08* (2009.01)

(52) U.S. Cl.
CPC ..... *H04W 76/27* (2018.02); *H04L 2027/0095* (2013.01); *H04W 48/08* (2013.01); *H04W 72/042* (2013.01)

(56) References Cited

OTHER PUBLICATIONS

Office action dated Apr. 25, 2019 for the Taiwan application No. 107126731, filed Aug. 1, 2018, pp. 1-25.
Search Report dated Dec. 11, 2018 for EP application No. 18186662.5, pp. 1-5.
Huawei, HiSilicon, "RACH Procedures and Resource Configuration", 3GPP TSG RAN WG1 Meeting #88, R1-1701724, Feb. 13-17, 2017, Athens, Greece, XP051208890, pp. 1-7.
Guangdong OPPO Mobile Telecom, "NR 4-Step Random Access Procedure", 3GPP TSG RAN WG1 Meeting #89, R1-1707694, May 15-19, 2017, Hangzhou, P.R. China, XP051272900, pp. 1-5.

* cited by examiner

DEVICE AND METHOD OF HANDLING CARRIER AGGREGATION AND DUAL CONNECTIVITY

CROSS REFERENCE TO RELATED APPLICATIONS

This application claims the benefit of U.S. Provisional Application No. 62/540,034 filed on Aug. 1, 2017, which is incorporated herein by reference.

BACKGROUND OF THE INVENTION

1. Field of the Invention

The present invention relates to a device and a method used in a wireless communication system, and more particularly, to a device and a method of handling a carrier aggregation and dual connectivity.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling a carrier aggregation and dual connectivity to solve the abovementioned problem.

A network comprising a first base station (BS) and a second BS, comprises at least one storage device and at least one processing circuit coupled to the at least one storage device. The at least one storage device stores, and the at least one processing circuit is configured to execute instructions of: the first BS connecting to a communication device via a first cell of the first BS with a signaling radio bearer (SRB); the second BS as a secondary node (SN) connecting to the communication device via a second cell while the first BS as a master node (MN) connecting to the communication device; the second BS transmitting a SN Modification Required message comprising a first radio resource control (RRC) message to the first BS, wherein the SN Modification Required message comprises a new or modified configuration and a random access (RA) channel (RACH) configuration, and the first RACH configuration configures at least one RACH resource and an association configuration associating the at least one RACH resource to a synchronization signal block (SSB) or a channel state information reference signal (CSI-RS) transmitted on the second cell; the first BS transmitting a RRC message comprising the new or modified configuration and the first RACH configuration on the SRB via the first cell to the communication device; the first BS receiving a RRC response message responding to the RRC message from the communication device on the SRB on the first cell or a third cell of the first BS; the second BS receiving a RA preamble transmitted by the communication device on the second cell according to the at least one RACH resource; the second BS transmitting a RA response (RAR) to the communication device on the second cell in response to the RA preamble; and the second BS communicating with the communication device according to the new or modified configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
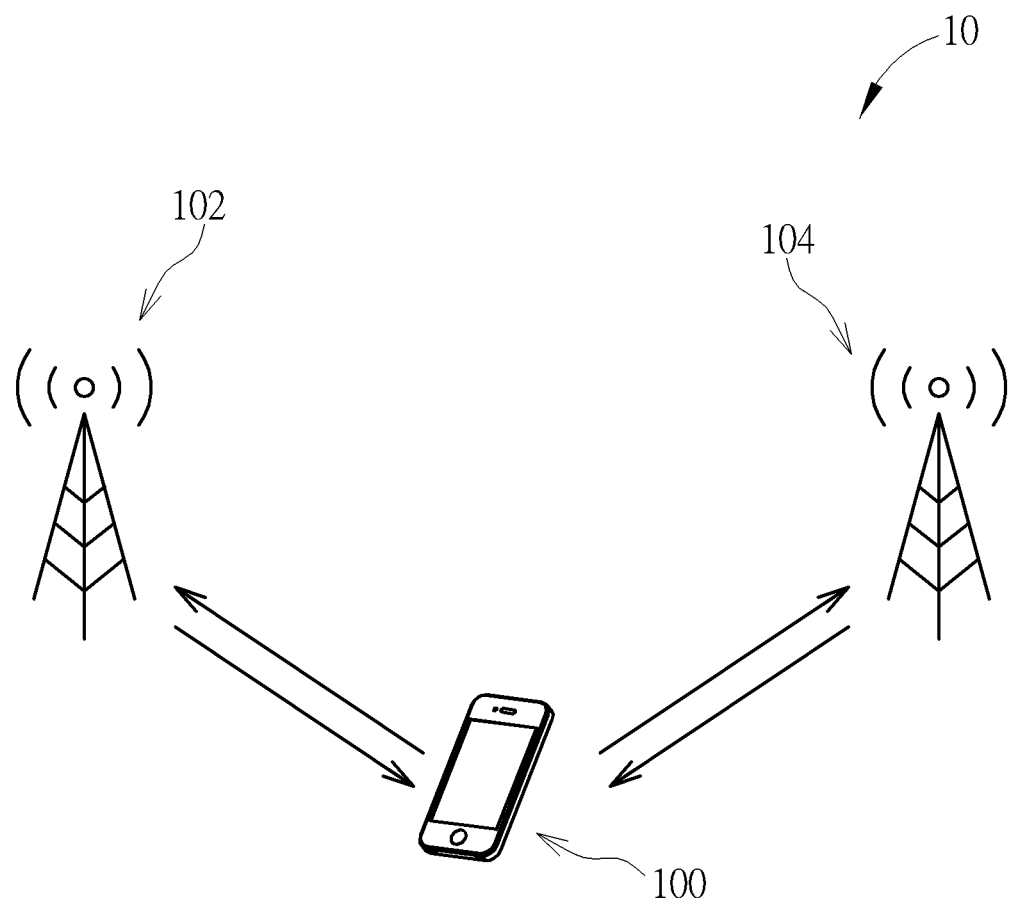
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

The communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN). The first carrier frequency and the second carrier frequency may or may not be overlapped.

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
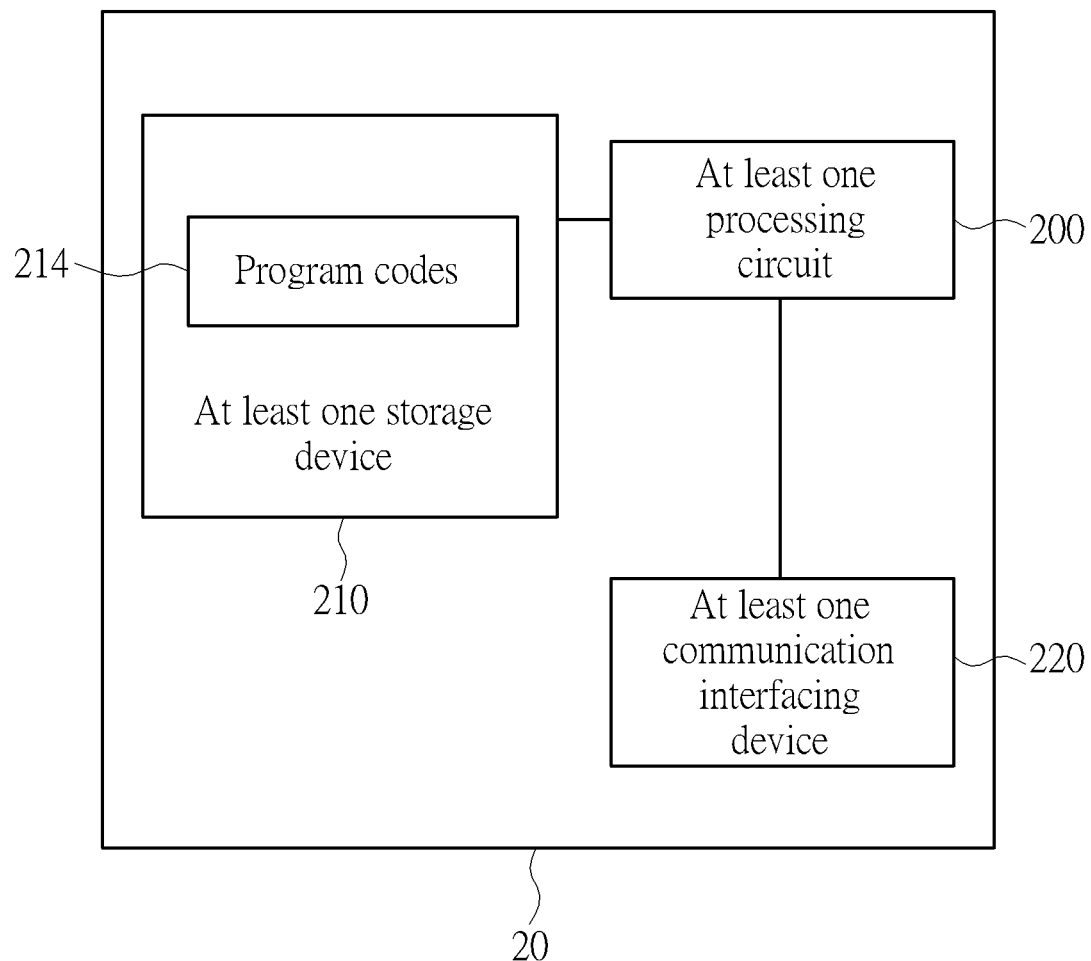
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the examples.

A protocol architecture may be used for illustrating that a use of a radio bearer (RB) depends on how the RB is setup. A radio bearer may be a data RB (DRB) for a user plane data transmission and/or reception, and a signalling RB (SRB) for a control plane data transmission and/or reception. A DRB configuration may include at least one of a DRB identity, a packet data convergence protocol (PDCP) configuration, a radio link control (RLC) configuration, a logical channel identity and a logical channel configuration (e.g., priority and/or logical channel group). A SRB configuration may include a SRB identity, the RLC configuration and the logical channel configuration. In the dual connectivity, there may be three types of RB: a master cell group (MCG) bearer, a secondary cell group (SCG) bearer and a split bearer. The MCG bearer may utilize radio protocols located at the MN, to radio resources (e.g., time and frequency resources) of the MN. The SCG bearer may utilize radio protocols located at the SN, to use radio resources of the SN. The split bearer may utilize protocols located at both the MN and the SN, to use both the radio resources of the MN and the SN. The split bearer may be a MCG split bearer or a SCG split bearer. A DRB may be the MCG bearer, the SCG bearer or the split bearer. A SRB may be configured as the MCG bearer or the split bearer.

In one example, a UE connects to the MN and has a first SRB, the MN transmits a measurement configuration on the first SRB to the UE. In detail, the UE transmits a measurement report on the first SRB to the MN in response to the measurement configuration. The MN initiates a SN Addition procedure for the UE with the SN in response to the measurement report. The MN configures the UE to connect to the SN in response to the SN Addition procedure by transmitting a radio resource control (RRC) message on the first SRB to the UE. The RRC message includes a SN configuration for the UE to connect to the SN. In response to the RRC message, the UE sets up a second SRB. The SN may transmit a second measurement configuration on the second SRB to the UE while the UE is in dual connectivity (DC) with the MN and the SN. The UE transmits a second measurement report to the SN on the second SRB in response to the second measurement configuration.

A new radio (NR) BS (e.g., gNB) broadcasts synchronization signal blocks (SSBs) in a pattern or periodically. A SSB includes a primary SS (PSS), a secondary SS (SSS) and a physical broadcast channel (PBCH). A SSB may have a SSB index (e.g., 6 bits) indicating/identifying the SSB. The SSB index may be carried in a PBCH on which a master information block (MIB) and demodulation reference signal (s) are transmitted by a BS.

Figure 3:
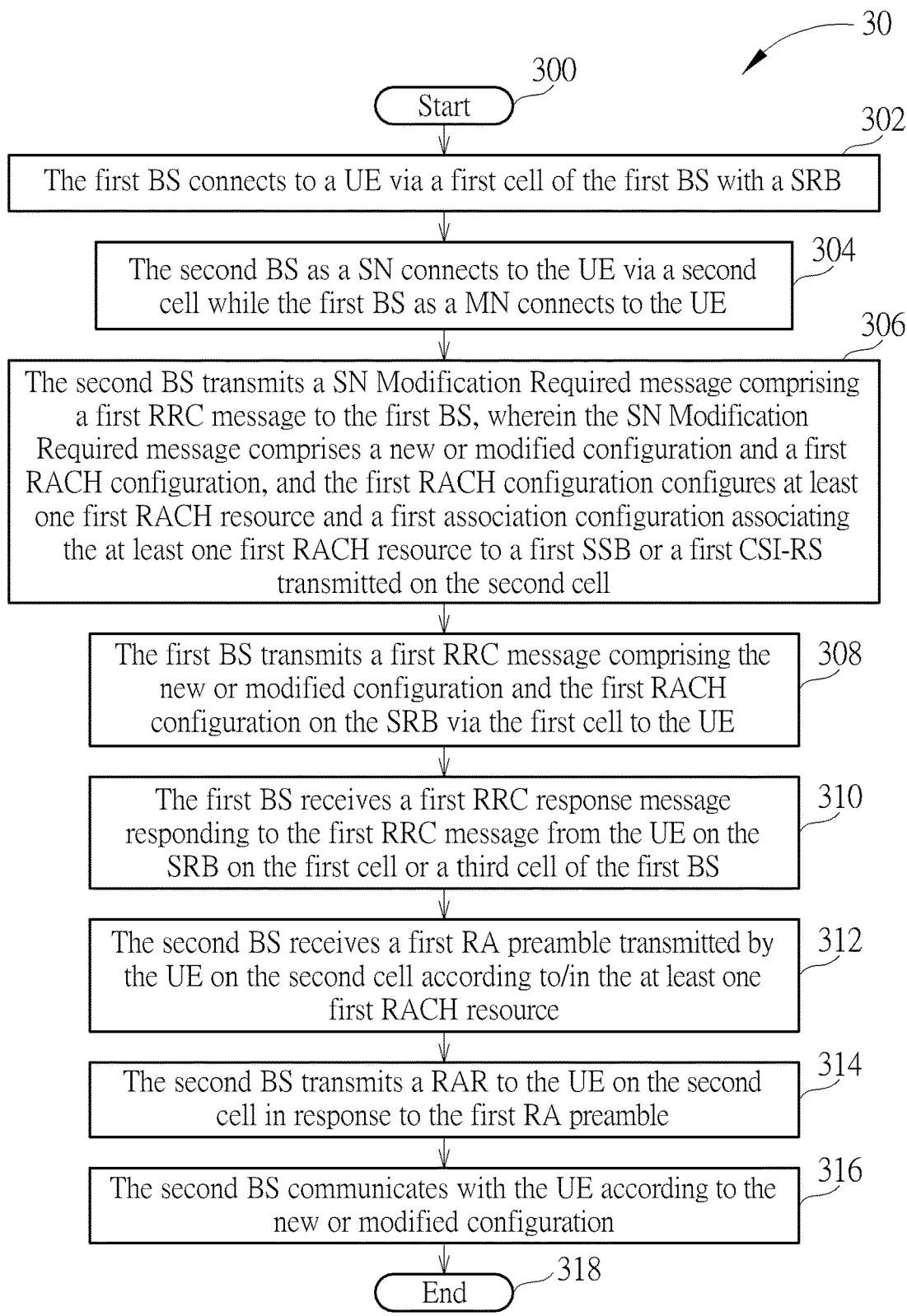
FIG. 3 is a flowchart of a process according to an example of the present invention.

A process 30 in FIG. 3 may be utilized in a network including a first BS (e.g., the BS 102) and a second BS (e.g., the BS 104), and includes the following steps:

Step 300: Start.

Step 302: The first BS connects to a UE via a first cell of the first BS with a SRB.

Step 304: The second BS as a SN connects to the UE via a second cell while the first BS as a MN connects to the UE.

Step 306: The second BS transmits a SN Modification Required message to the first BS, wherein the SN Modification Required message comprises a new or modified configuration and a first random access (RA) channel (RACH) configuration, and the first RACH configuration configures at least one first RACH resource and a first association configuration associating the at least one first RACH resource to a first SSB or a first channel state information RS (CSI-RS) transmitted on the second cell.

Step 308: The first BS transmits a first RRC message comprising the new or modified configuration and the first RACH configuration on the SRB via the first cell to the UE.

Step 310: The first BS receives a first RRC response message responding to the first RRC message from the UE on the SRB on the first cell or a third cell of the first BS.

Step 312: The second BS receives (or detects) a first RA preamble transmitted by the UE on the second cell according to/in the at least one first RACH resource.

Step 314: The second BS transmits a RA response (RAR) to the UE on the second cell in response to the first RA preamble.

Step 316: The second BS communicates with the UE according to the new or modified configuration.

Step 318: End.

In one example, the RAR includes a preamble identifier associated to the first RA preamble. The new or modified configuration is used for communication between the second BS and the UE.

In one example, the SN Modification Required message includes a second RRC message including the new or modified configuration and the first RACH configuration. The first RRC message includes the second RRC message to include the new or modified configuration and the first RACH configuration.

In one example, the new configuration is a configuration of SCG bearer(s), a configuration of a SCG part of a MCG split bearer or a configuration of a SCG part of a SCG split bearer. The modified configuration may be a modified configuration of the SCG bearer(s), a modified configuration of the SCG part of the MCG split bearer or a modified configuration of the SCG part of the SCG split bearer.

In one example, the first cell is a primary cell (PCell) or a secondary cell (SCell). The second cell may be a primary SCell (PSCell). The third cell may be a SCell or a PCell.

In one example, the second BS transmits (or broadcasts) the first SSB or the first CSI-RS on the second cell. When the first association configuration associates the at least one first RACH resource to the first CSI-RS instead of the first SSB, the second BS may still transmit the first SSB on the second cell.

In one example, the second BS obtains (e.g., determines) the first association configuration according to a first measurement result included in a SN message received form the first BS. The first measurement result is associated to the first SSB or the first CSI-RS, and is received from the UE on the SRB. In one example, the second BS determines the first association configuration according to a first measurement result received from the UE directly on a second SRB between the UE and the second BS, and the first measurement result is associated to the first SSB or the first CSI-RS. The first measurement result may include a signal strength value of the first SSB and an SSB index of the first SSB or a CSI-RS index (or identity/identifier) of the first CSI-RS. Thus, the second BS knows that the signal strength value is associated to the first SSB or the first CSI-RS.

In one example, the second BS determines the first association configuration according to a channel state information (CSI) received from the UE on a physical UL control channel (PUCCH) on the second cell and the CSI is associated to the first SSB or the first CSI-RS.

In one example, the second BS determines the first association configuration according to a transmission on a physical UL control channel (PUSCH) last or recently received from the UE.

In one example, the second BS configures the at least one first RACH resource for the UE to transmit the first RA preamble on the second cell. In response to the first RRC message, the UE may transmit the first RA preamble according to/in (or on) at least one of the at least one first RACH resource on the second cell, when the UE receives (or detects) the first SSB or the first CSI-RS. The second BS may receive the first RA preamble in (or on) the at least one of the at least one first RACH resource.

In one example, the UE communicates with the second BS on the second cell according to the new or modified configuration, while communicating with the first BS.

In one example, according to the first RA preamble received by the second BS, the second BS may decide (e.g., determine) to use (e.g., operate) at least one transmit (Tx) beam associated to the first SSB or the first CSI-RS to transmit data on the second cell to the UE according to/in response to the first RA preamble. That is, in response to the first RA preamble, the second BS may transmit control signal(s) (e.g., physical DL control channel (PDCCH)) and data (e.g., physical DL shared channel (PDSCH)) on the at least one Tx beam to the UE.

In one example, the second BS may transmit the RAR on the second cell. The second BS may transmit the RAR on a Tx beam which is associated to (corresponding to) the first SSB or the first CSI-RS on the second cell or which is associated to (corresponding to) a receive (Rx) beam receiving the first RA preamble.

In one example, the second BS transmits transmissions on a first plurality of Tx beams or on a single Tx beam in the second cell. The second BS may transmit transmissions on a second plurality of Tx beams in a SCell. The first plurality of Tx beams may be same as or different from the second plurality of Tx beams. One or more of the first plurality of Tx beams may be same as one or more of the second plurality of Tx beams.

In one example, the at least one first RACH resource includes time resource(s) and/or frequency resource(s) and/or the first RA preamble. A time resource may include a time unit (e.g., OFDM symbol(s), mini-slot(s), slot(s) or subframe(s)). A frequency resource may include PRB(s) or subcarrier(s). A PRB may include a plurality of subcarriers (e.g., 12 or 24 subcarriers). In one example, the first RA preamble may a dedicated preamble, e.g., configured in the first RACH configuration or in the second RRC message, or in a PDCCH order. In one example, the first RA preamble is selected by the UE from a plurality of RA preambles. In one example, the plurality of RA preambles is configured in the first RACH configuration or in the second RRC message, is predefined in a 3GPP specification or is configured in a system information block (SIB). The SIB may be included in the second RRC message or broadcasted by the second BS on the second cell.

In one example, the first association configuration includes the SSB index of the first SSB. In one example, the first association configuration includes a CSI-RS configuration of the first CSI-RS. The CSI-RS configuration may configure time resource and/or frequency resource of the first CS-RS. The CSI-RS configuration may include the CSI-RS index identifying the first CSI-RS.

In one example, the first RACH configuration includes at least one second RACH resource and a second association configuration associating the at least one second RACH resource to a second SSB or a second CSI-RS transmitted on the second cell. The at least one second RACH resource may include time resource(s) and/or frequency resource(s) and/or a second RA preamble. Then, the UE may determine to use the at least one first RACH resource instead of the at least one second RACH resource, when a signal strength of the first SSB (or the first CSI-RS) measured/received by the UE is better than a signal strength of the second SSB (or the second CSI-RS) measured/received by the UE. In one example, the first RRC message includes a second RACH configuration including the at least one second RACH resource and the second association configuration.

In one example, the second BS obtains (e.g., determines) the second association configuration according to a second measurement result included in the SN message received from the first BS. The second BS may determine the second association configuration according to a second measurement result received from the UE directly on the second SRB.

In one example, the second BS obtains (e.g., determines) the second association configuration according to a CSI received from the UE on a physical UL control channel (PUCCH) on the second cell, and the CSI is associated to the second SSB or the second CSI-RS. The second BS may determine the second association configuration according to a transmission on a PUSCH last or recently received from the UE.

In the above examples, the UE may determine to use the at least one second RACH resource instead of the at least one first RACH resource, when a signal strength of the second SSB (or the second CSI-RS) measured/received by the UE is better than a signal strength of the first SSB (or the first CSI-RS) measured/received by the UE. In response to the determination, the UE may transmit the first RA preamble or a second RA preamble in at least one of the at least one second RACH resource. In one example, the second RA preamble is configured in the first RACH configuration and is associated to the at least one second RACH resource and/or the second SSB (or the second CSI-RS). In one example, the second RA preamble may be selected from a plurality of RA preambles configured in the first RACH configuration, may be predefined in a 3GPP specification or may be configured in the SIB.

In one example, the second association configuration may configure (or includes) a SSB index of the second SSB. In one example, the second association configuration includes a CSI-RS configuration of the second CSI-RS. The CSI-RS configuration may configure time resource and/or frequency resource of the second CS-RS. The CSI-RS configuration may include a CSI-RSI index identifying the second CSI-RS.

In one example, the second RRC message does or does not configure a handover.

In one example, the first RRC message does not configure a handover. The first RRC message may or may not change a configuration of the MN transmitted to the UE before. The first RRC message may or may not include a new configuration which has not been transmitted to the UE before.

In one example, the first BS is a MN (e.g., Master eNB) and the second BS is a SN (e.g., Secondary gNB). The second RRC message may be a NR RRC message (e.g., NR RRC Reconfiguration message). In one example, the first RRC response message may include a second RRC response message (e.g., NR RRC Reconfiguration Complete message) responding to the second RRC message. The first RRC message may be an E-UTRA RRC message (e.g., E-UTRA RRC Connection Reconfiguration message). The first RRC response message may be an E-UTRA RRC response message (e.g., E-UTRA RRC Connection Reconfiguration Complete message).

In one example, the UE connects to the first BS (or the first BS connects to the UE) by performing a RRC connection establishment procedure.

In one example, the UE connects to the first BS (or the first BS connects to the UE) by performing a handover procedure initiated by a third BS. The third BS may transmit a handover command to the UE to initiate the handover procedure. When the first BS receives a handover complete message from the UE, the first BS connects to the UE. When the UE transmits the handover complete message to the first BS, the UE connects to the first BS.

In one example, the RACH configuration includes at least one information element (IE) which includes a RACH resource (e.g., the at least one (first and/or second) RACH resource) and/or the above association configuration.

In one example, the at least one first RACH resource and the at least one second RACH resource may be different. The first SSB and the second SSB may be different. The first CSI-RS and the second CSI-RS may be different.

In one example, the second BS receives a first UE capability of the UE from the first BS in a SN Addition Request message. The first UE capability may be related to a beamforming capability (e.g., beam correspondence supported or not) or a RA capability. The second BS may determine a RACH resource (e.g., the at least one (first and/or second) RACH resource) (e.g., content of the RACH resource) according to the first UE capability. In one example, the SN Addition Request message may include a second UE capability of the UE. The second UE capability may be related to a CSI-RS receiving capability (e.g., a CSI-RS is supported or not). The second BS may determine a RACH resource associated to the CSI-RS, when the second UE capability indicates that the CSI-RS is supported. The second BS may determine the RACH resources associated to the SSB, when the second UE capability indicates that the CSI-RS is not supported.

In one example, the second BS may transmit a PDCCH order (e.g., a DL control information (DCI)) on the second cell to the UE, when/after transmitting the SN Modification Required message to the first BS or receiving the second RRC response message from the first BS. The PDCCH order may indicate to the UE to transmit the first (or second) RA preamble. For example, the PDCCH order may configure the first (or second) RA preamble by including the preamble identifier associated to (of or corresponding to) the first (or second) RA preamble. The second BS may transmit the PDCCH order together with the first SSB or the first CSI-RS in a time resource.

Figure 4:
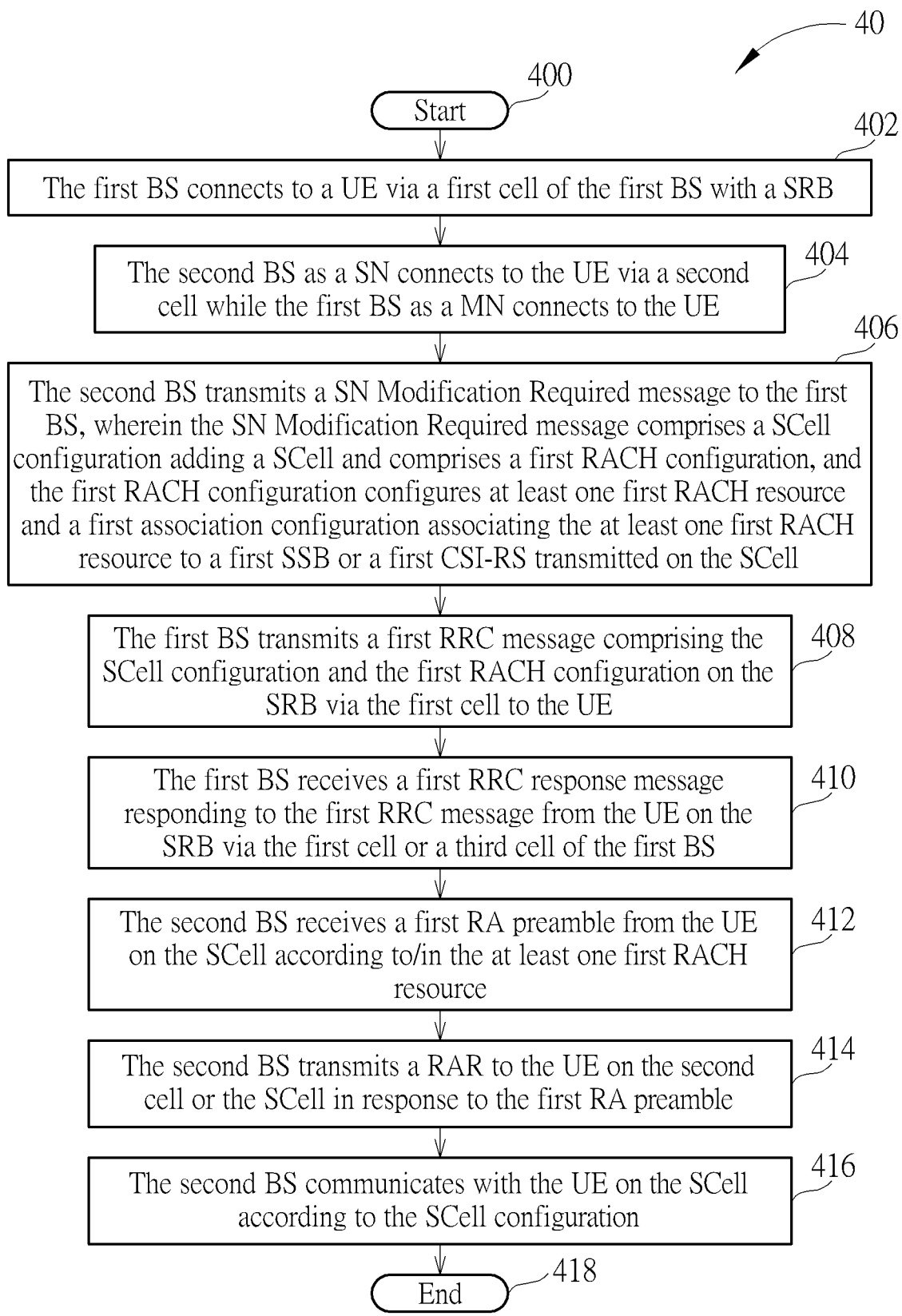
FIG. 4 is a flowchart of a process according to an example of the present invention.

A process 40 in FIG. 4 may be utilized in a network including a first BS (e.g., the BS 102) and a second BS (e.g., the BS 104), and includes the following steps:

Step 400: Start.

Step 402: The first BS connects to a UE via a first cell of the first BS with a SRB.

Step 404: The second BS as a SN connects to the UE via a second cell while the first BS as a MN connects to the UE.

Step 406: The second BS transmits a SN Modification Required message to the first BS, wherein the SN Modification Required message comprises a SCell configuration adding a SCell and comprises a first RACH configuration, and the first RACH configuration configures at least one first RACH resource and a first association configuration associating the at least one first RACH resource to a first SSB or a first CSI-RS transmitted on the SCell.

Step 408: The first BS transmits a first RRC message comprising the SCell configuration and the first RACH configuration on the SRB via the first cell to the UE.

Step 410: The first BS receives a first RRC response message responding to the first RRC message from the UE on the SRB via the first cell or a third cell of the first BS.

Step 412: The second BS receives (or detects) a first RA preamble from the UE on the SCell according to/in the at least one first RACH resource.

Step 414: The second BS transmits a RAR to the UE on the second cell or the SCell in response to the first RA preamble.

Step 416: The second BS communicates with the UE on the SCell according to the SCell configuration.

Step 418: End.

In one example, the SN Modification Required message includes a second RRC message including the SCell configuration and the first RACH configuration. The first RRC message includes the second RRC message to include the SCell configuration and the first RACH configuration. The second BS communicates with the UE on the SCell according to the second RRC message.

In one example, the UE and the second BS communicate with each other on the SCell according to the SCell configuration while the UE communicates with the first BS.

In one example, the second BS transmits (or broadcasts) the first SSB or the first CSI-RS on the SCell. When the first association configuration associates the at least one first RACH resource to the first CSI-RS instead of the first SSB, the second BS may still transmit the first SSB on the SCell.

In one example, the at least one first RACH resource includes time resource and/or frequency resource on the SCell and/or the first RA preamble.

In one example, in response to the first (or second) RRC message, the UE transmits the first RA preamble using/in (or on) at least one of the at least one first RACH resource on the SCell when the UE receives (or detects) the first SSB or the first CSI-RS. According to the first RA preamble received by the second BS, the second BS knows that the UE receives the first SSB or the first CSI-RS on the SCell. In one example, the second BS determines to use (e.g., operate) at least one Tx beam associated to the first SSB or the first CSI-RS to transmit a control signal (e.g., PDCCH) and/or data (e.g., PDSCH) on the SCell to the UE, according to/in response to the first RA preamble.

In one example, the second BS transmits the RAR on the SCell. The second BS may transmit the RAR on a Tx beam which is associated to (corresponding to) the first SSB or the first CSI-RS on the SCell or which is associated to (corresponding to) a receive (Rx) beam receiving the first RA preamble.

In one example, the second BS transmits the RAR on the second cell. The second BS may transmit the RAR on a Tx beam (e.g., narrow beam or wide beam) on the second cell, wherein the Tx beam is neither associated to the first SSB nor associated to the first CSI-RS. The Tx beam may be associated to a third SSB or a third CSI-RS transmitted on the second cell.

In one example, the first RACH configuration includes at least one second RACH resource and a second association configuration associating to the at least one second RACH resource to a second SSB or a second CSI-RS transmitted on the SCell. The at least one second RACH resource may include time resource(s) and/or frequency resource(s) on the SCell and/or a second RA preamble. In one example, the first (or second) RRC message includes a second RACH configuration including the at least one second RACH resource and the second association configuration. Then, the UE may determine to use the at least one first RACH resource instead of the at least one second RACH resource, when a signal strength of the first SSB (or the first CSI-RS) measured/received by the UE is better than a signal strength of the second SSB (or the second CSI-RS) measured/received by the UE.

In the above examples, the UE may determine to use the at least one second RACH resource instead of the at least one first RACH resource, when a signal strength of the second SSB (or the second CSI-RS) measured/received by the UE is better than a signal strength of the first SSB (or the first CSI-RS) measured/received by the UE. In response to the determination, the UE may transmit the first RA preamble or a second RA preamble in at least one of the at least one second RACH resource. In one example, the second RA preamble may be configured in the first RACH configuration and associated to the at least one second RACH resource and/or the second SSB (or the second CSI-RS). In one example, the second RA preamble may be selected from a plurality of RA preambles configured in the first RACH configuration, may be predefined in a 3GPP specification or may be configured in a SIB. The SIB may be included in the second RRC message or broadcasted by the second BS on the SCell.

In one example, the second RRC message configures the SCell without involving the handover.

The description and the examples for the process 30 may be applied to the process 40, and are not repeated herein.

Figure 5:
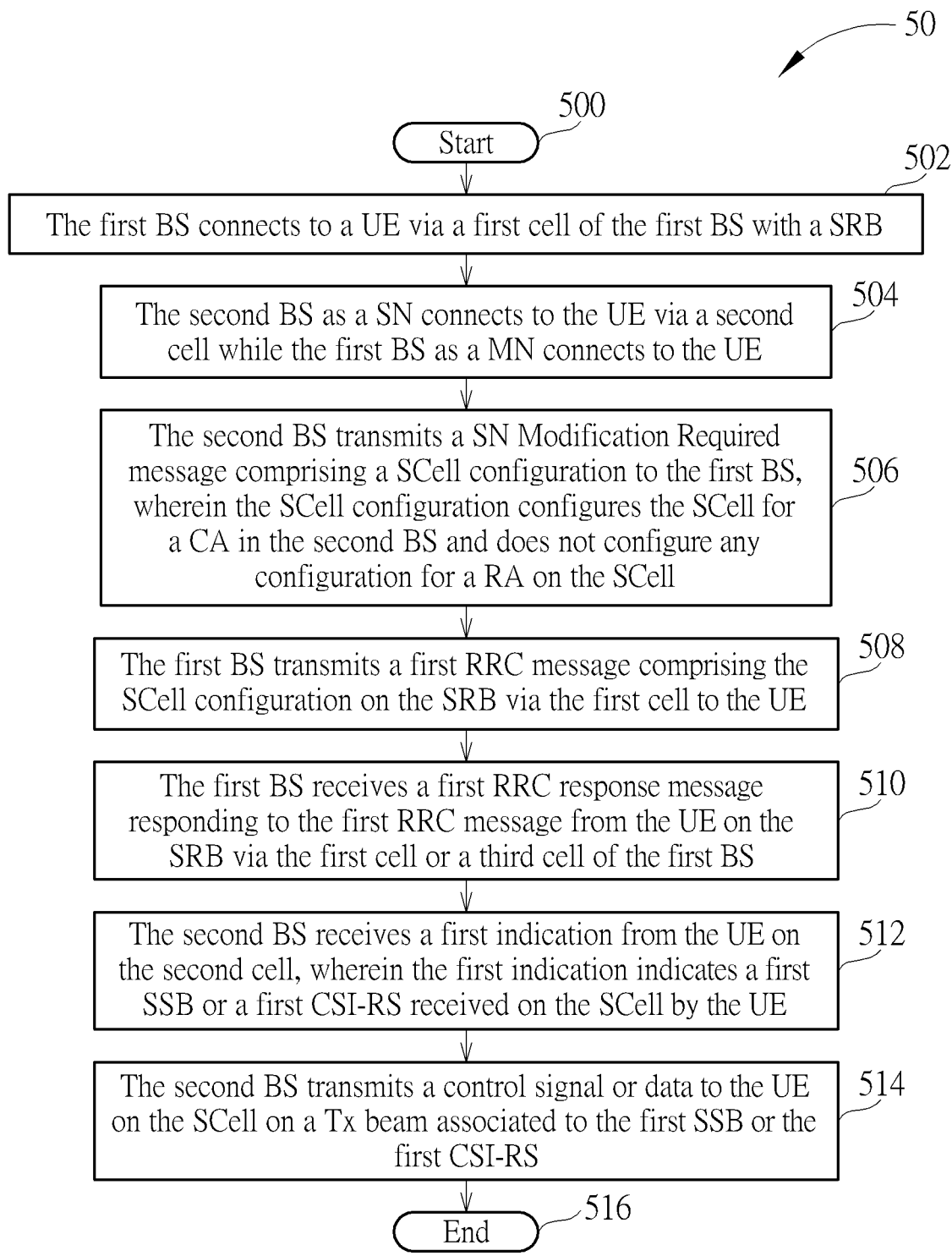
FIG. 5 is a flowchart of a process according to an example of the present invention.

A process 50 in FIG. 5 may be utilized in a network including a first BS (e.g., the BS 102) and a second BS (e.g., the BS 104), and includes the following steps:

Step 500: Start.

Step 502: The first BS connects to a UE via a first cell of the first BS with a SRB.

Step 504: The second BS as a SN connects to the UE via a second cell while the first BS as a MN connects to the UE.

Step 506: The second BS transmits a SN Modification Required message comprising a SCell configuration to the first BS, wherein the SCell configuration configures the SCell for a CA in the second BS and does not configure any configuration for a RA on the SCell.

Step 508: The first BS transmits a first RRC message comprising the SCell configuration on the SRB via the first cell to the UE.

Step 510: The first BS receives a first RRC response message responding to the first RRC message from the UE on the SRB via the first cell or a third cell of the first BS.

Step 512: The second BS receives a first indication from the UE on the second cell, wherein the first indication indicates a first SSB or a first CSI-RS received on the SCell by the UE.

Step 514: The second BS transmits a control signal or data to the UE on the SCell on a Tx beam associated to the first SSB or the first CSI-RS.

Step 516: End.

According to the process 50, the second BS knows that the UE receives the first SSB or the first CSI-RS on the SCell, and transmits the control signals or the data to the UE on the SCell on the Tx beam associated to the first SSB or the first CSI-RS. In one example, the first indication includes information associated to the first SSB or the first CSI-RS. The information may include a measurement result or a channel quality indicator (CQI) value.

In one example, the SN Modification Required message includes a second RRC message including the SCell configuration. The first RRC message includes the second RRC message to include the SCell configuration. The second BS communicates with the UE via the SCell according to the SCell configuration or the second RRC message.

In one example, the second BS receives a second indication from the UE on the second cell, wherein the second indication indicates a second SSB or a second CSI-RS received on the SCell by the UE. In one example, the second indication includes information associated to the second SSB or the second CSI-RS. The information may include a measurement result or a CQI value.

In one example, the first (or second) indication is transmitted in a PUCCH in a PUCCH message. In one example, the first (or second) indication is transmitted in a reference signal (RS) (e.g., sounding reference signal (SRS), demodulation signal or specific reference signal). In one example, the first (or second) indication is transmitted in a physical UL shared channel (PUSCH). The PUSCH may include a Medium Access Control (MAC) PDU, a MAC Control Element (CE), a RLC PDU, a PDCP PDU or a RRC message.

In one example, the first indication and the second indication are transmitted in a same PUCCH message or different PUCCH messages, in a same RS or different RSs, or in a same PUSCH or different PUSCHs.

In one example, the first (or second) RRC message may configure a time resource and/or a frequency resource on the second cell for the UE to transmit the first (or second) indication. Thus, the UE may transmit the first (or second) indication on the time resource and/or the frequency resource.

In one example, the second BS configures the time resource and/or the frequency resource to the UE, e.g., via the first BS in a third RRC message before the first (or second) RRC message. In one example, the time resource and/or the frequency resource may be configured by a DCI transmitted by the second BS in the PDCCH on the second cell.

Examples for the processes 30-40 may be applied to the process 50, and are not repeated herein. The following may be applied to the processes 40 and 50.

In one example, the second BS transmits an activation command to the UE on the second cell in response to the SCell configuration. The activation command is to order the UE to activate the SCell (i.e., order the UE to activate a communication on the SCell). The second BS may transmit the PDCCH order after transmitting the activation command. For example, the second BS transmits the activation command, when/after transmitting the SCell configuration or receiving the second RRC response message. The activation command may be a MAC CE in a MAC PDU or may be a DCI. In one example of the process 40, the UE may (start to) transmit the first (or second) RA preamble, when/after activating the SCell. In one example of the process 50, the UE may (start to) transmit the indication, when/after activating the SCell.

In one example, the second BS does not transmit the activation command as described above. In one example of the process 40, the UE may transmit the first (or second) RA preamble, when/after/in response to synchronizing to the SCell in a DL without the PDCCH order (i.e., in response to the first RRC message instead of the PDCCH order). In one example of the process 50, the UE may transmit the indication, when/after/in response to synchronizing to the SCell in the DL.

Figure 6:
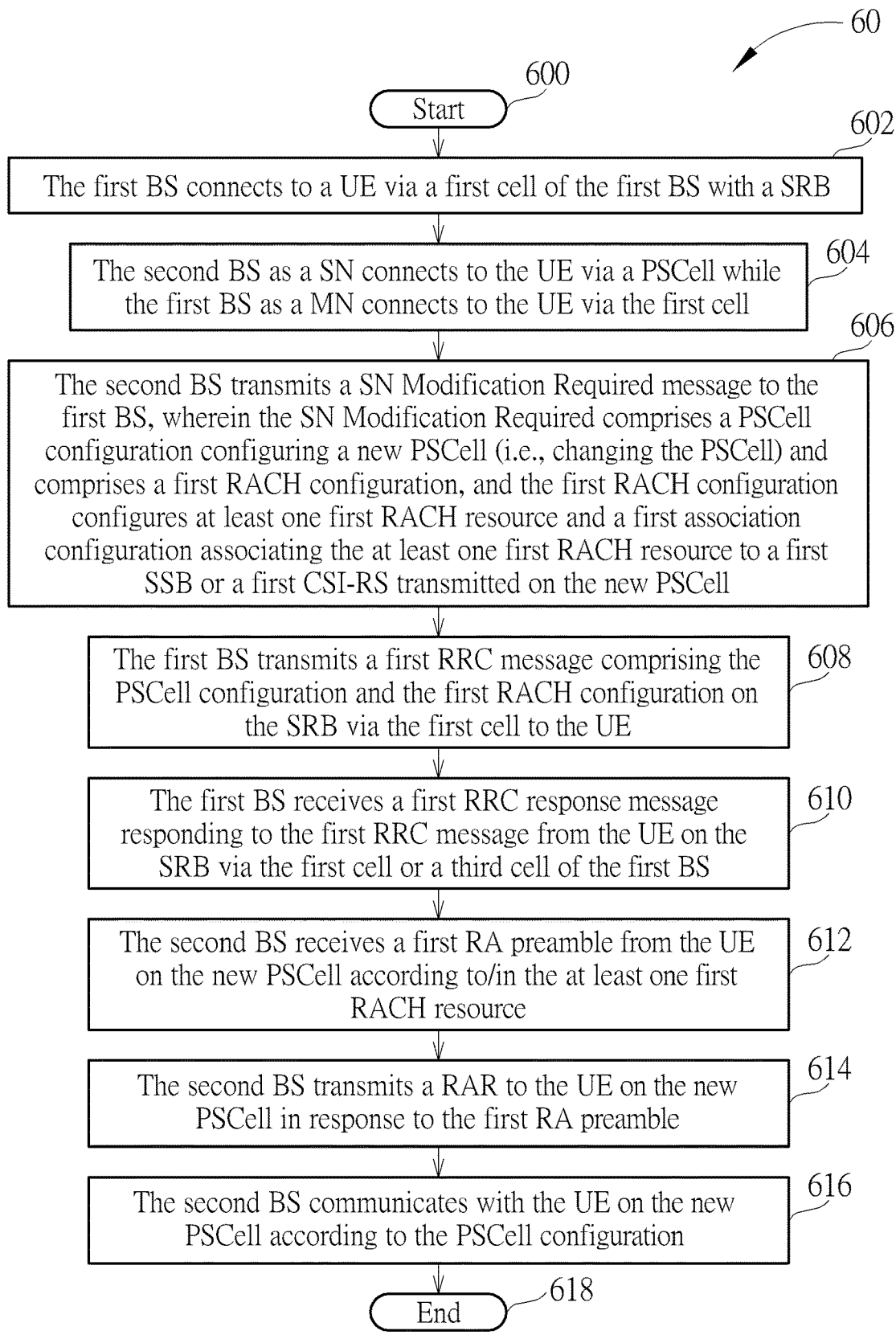
FIG. 6 is a flowchart of a process according to an example of the present invention.

A process 60 in FIG. 6 may be utilized in a network including a first BS (e.g., the BS 102) and a second BS (e.g., the BS 104) S, and includes the following steps:

Step 600: Start.

Step 602: The first BS connects to a UE via a first cell of the first BS with a SRB.

Step 604: The second BS as a SN connects to the UE via a PSCell while the first BS as a MN connects to the UE via the first cell.

Step 606: The second BS transmits a SN Modification Required message to the first BS, wherein the SN Modification Required comprises a PSCell configuration configuring a new PSCell (i.e., changing the PSCell) and comprises a first RACH configuration, and the first RACH configuration configures at least one first RACH resource and a first association configuration associating the at least one first RACH resource to a first SSB or a first CSI-RS transmitted on the new PSCell.

Step 608: The first BS transmits a first RRC message comprising the PSCell configuration and the first RACH configuration on the SRB via the first cell to the UE.

Step 610: The first BS receives a first RRC response message responding to the first RRC message from the UE on the SRB via the first cell or a third cell of the first BS.

Step 612: The second BS receives (or detects) a first RA preamble from the UE on the new PSCell according to/in the at least one first RACH resource.

Step 614: The second BS transmits a RAR to the UE on the new PSCell in response to the first RA preamble.

Step 616: The second BS communicates with the UE on the new PSCell according to the PSCell configuration.

Step 618: End.

According to the process 60, the UE communicates with the second BS on the new PSCell according to the PSCell configuration, while connecting to the first BS on the PCell. Thus, the UE simultaneously communicates with the second BS on the new PSCell and with the first BS on the PCell. The PSCell configuration may include configuration(s) of the new PSCell.

In one example, the SN Modification Required message includes a second RRC message including the PSCell configuration and the first RACH configuration. The first RRC message includes the second RRC message to include the PSCell configuration and the first RACH configuration. The second BS communicates with the UE on the new PSCell according to the second RRC message.

The description and the examples for the processes 30-50 may be applied to the process 60, and are not repeated herein. The description for the SCell or the second cell may be applied to the new PSCell. The following may be applied to the processes above.

In one example, the second BS transmits a SN Modification Request message according to its determination or in response to a SN message received from the first BS. In one example, "SN" may be replaced by "Secondary gNB (SgNB)".

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. For example, in the above description, description for the first BS may be compiled into the program codes 214 in the first BS, and description for the second BS may be compiled into the program codes 214 in the second BS.

To sum up, the present invention provides a method and related communication device for efficiently handling a carrier aggregation and dual connectivity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS, comprising:
    at least one storage device; and
    at least one processing circuit, coupled to the at least one storage device, wherein the at least one storage device stores, and the at least one processing circuit is configured to execute instructions of:
    the first BS connecting to a communication device via a first cell of the first BS with a signaling radio bearer (SRB);
    the second BS as a secondary node (SN) connecting to the communication device via a second cell while the first BS as a master node (MN) connecting to the communication device;
    the second BS transmitting a SN Modification Required message to the first BS, wherein the SN Modification Required message comprises a new or modified configuration and a random access (RA) channel (RACH) configuration, and the RACH configuration configures at least one RACH resource and an association configuration associating the at least one RACH resource to a synchronization signal block (SSB) or a channel state information reference signal (CSI-RS) transmitted on the second cell;
    the first BS transmitting a radio resource control (RRC) message comprising the new or modified configuration and the RACH configuration on the SRB via the first cell to the communication device;
    the first BS receiving a RRC response message responding to the RRC message from the communication device on the SRB on the first cell or a second cell of the first BS;
    the second BS receiving a RA preamble transmitted by the communication device on the second cell according to the at least one RACH resource;
    the second BS transmitting a RA response (RAR) to the communication device on the second cell in response to the RA preamble; and
    the second BS communicating with the communication device according to the new or modified configuration.

2. The network of claim 1, wherein the RA preamble is a dedicated preamble or is selected by the communication device from a plurality of RA preambles configured in the RACH configuration.

3. The network of claim 1, wherein the instructions further comprise:

the second BS operating at least one transmit (Tx) beam associated to the SSB or the CSI-RS to transmit a control signal and/or data on the second cell to the communication device, according to the RA preamble.

4. The network of claim 1, wherein the association configuration comprises a SSB index of the SSB or comprises a CSI-RS configuration of the CSI-RS.

5. A network comprising a first base station (BS) and a second BS, comprising:
- at least one storage device; and
- at least one processing circuit, coupled to the at least one storage device, wherein the at least one storage device stores, and the at least one processing circuit is configured to execute instructions of:
- the first BS connecting to a communication device via a first cell of the first BS with a signaling radio bearer (SRB);
- the second BS as a secondary node (SN)connecting to the communication device via a second cell while the first BS as a master node (MN)connecting to the communication device;
- the second BS transmitting a SN Modification Required message to the first BS, wherein the SN Modification Required message comprises a secondary cell (SCell) configuration adding a SCell and comprises a random access (RA) channel (RACH) configuration, and the RACH configuration configures at least one RACH resource and an association configuration associating the at least one RACH resource to a synchronization signal block (SSB) or a channel state information reference signal (CSI-RS) transmitted on the SCell;
- the first BS transmitting a RRC message comprising the SCell configuration and the RACH configuration on the SRB via the first cell to the communication device;
- the first BS receiving a RRC response message responding to the RRC message from the communication device on the SRB via the first cell or a second cell of the first BS;
- the second BS receiving a RA preamble from the communication device on the SCell according to the at least one RACH resource;
- the second BS transmitting a RA response (RAR) to the communication device on the second cell or the SCell in response to the RA preamble; and
- the second BS communicating with the communication device on the SCell according to the SCell configuration.

6. The network of claim 5, wherein the RA preamble is a dedicated preamble configured in the RACH configuration or in a physical downlink (DL) control channel (PDCCH) order.

7. The network of claim 5, wherein the instructions further comprise:
- the second BS operating at least one transmit (Tx) beam associated to the SSB or the CSI-RS to transmit a control signal and/or data on the SCell to the communication device, according to the RA preamble.

8. The network of claim 5, wherein the association configuration comprises a SSB index of the SSB or comprises a CSI-RS configuration of the CSI-RS.

9. A network comprising a first base station (BS) and a second BS, comprising:
- at least one storage device; and
- at least one processing circuit, coupled to the at least one storage device, wherein the at least one storage device stores, and the at least one processing circuit is configured to execute instructions of:
- the first BS connecting to a communication device via a first cell of the first BS with a signaling radio bearer (SRB);
- the second BS as a secondary node (SN) connecting to the communication device via a primary secondary cell (PSCell) while the first BS as a master node (MN) connecting to the communication device via the first cell;
- the second BS transmitting a SN Modification Required message to the first BS, wherein the SN Modification Required message comprises a PSCell configuration configuring a new PSCell and comprises a random access (RA) channel (RACH) configuration, and the RACH configuration configures at least one RACH resource and an association configuration associating the at least one RACH resource to a synchronization signal (SS) block or a channel state information reference signal (CSI-RS) transmitted on the new PSCell;
- the first BS transmitting a RRC message comprising the PSCell configuration and the first RACH configuration on the SRB via the first cell to the communication device;
- the first BS receiving a RRC response message responding to the RRC message from the communication device on the SRB via the first cell or a second cell of the first BS;
- the second BS receiving a RA preamble from the communication device on the new PSCell according to the at least one RACH resource;
- the second BS transmitting a RA response (RAR) to the communication device on the new PSCell in response to the RA preamble; and
- the second BS communicating with the communication device on the new PSCell according to the PSCell configuration.

10. The network of claim 9, wherein the RA preamble is a dedicated preamble, or is selected by the communication device from a plurality of RA preambles.

11. The network of claim 9, wherein the instructions further comprise:
- the second BS operating at least one transmit (Tx) beam associated to the SSB or the CSI-RS to transmit a control signal and/or data on the second cell to the communication device, according to the RA preamble.

12. The network of claim 9, wherein the association configuration comprises a SSB index of the SSB or comprises a CSI-RS configuration of the CSI-RS.

* * * * *